United States Patent [19]

Corsberg

[11] Patent Number: 4,812,819

[45] Date of Patent: Mar. 14, 1989

[54] FUNCTIONAL RELATIONSHIP-BASED ALARM PROCESSING SYSTEM

[75] Inventor: Daniel R. Corsberg, Idaho Falls, Id.

[73] Assignee: The United States of America as represented by the United States Department of Energy, Washington, D.C.

[21] Appl. No.: 184,927

[22] Filed: Apr. 22, 1988

Related U.S. Application Data

[63] Continuation-in-part of Ser. No. 37,897, Apr. 13, 1987, Pat. No. 4,749,985.

[51] Int. Cl.$^4$ ............................................. G08B 23/00
[52] U.S. Cl. .................................. 340/517; 340/500; 340/506; 340/519; 340/522; 340/523; 340/525; 364/431.01
[58] Field of Search ............... 340/517, 500, 501, 506, 340/519, 520, 521, 522, 525, 510, 511, 523, 524; 364/138, 141, 147, 550, 431.01

[56] References Cited

U.S. PATENT DOCUMENTS 4,015,237  3/1977  Takatani ............................. 340/519
4,401,971  8/1983  Saito et al. ........................ 340/519

OTHER PUBLICATIONS

Daniel R. Corsberg–"Alarm Filtering: Practical Control Room Upgrade Using Expert Systems Concepts" INTECH, Apr. 1987.
Daniel R. Corsberg et al. "A Nuclear Reactor Alarm Display System Utilizing AI Techniques for Alarm Filtering" ANS Topical Meeting, Aug. 27–Sep. 1, 1987.
DMA (Diagnosis of Multiple Alarms), disclosed in an article by M. M. Danchak, entitled "Alarms Within Advanced Display Streams: Alternatives and Performance Measures", published in NUREG/CR-2276, EGG-2202, Sep. 1982.
Star Disclosed in an Article by L. Felkel, entitled "The Star Concept, Systems to Assist the Operator During Abnormal Events, " published in *Atomkernenrgie, Kertechnik*, vol. 45, No. 4, 1984, pp. 252–262.
DASS (Disturbance Analysis and Surveillance Systems), disclosed in an article by A. B. Long, R. M. Kanazava et al, entitled "Summary and Evaluation of Scoping and Feasibility Studies for Disturbance Analysis and Surveillance Systems (DASS)", published in Topical Report EPRI NP-1684, Dec. 1980.
Esparza et al., "Safety Monitoring in Process and Control", Presentation Mexican–American Engineering Society, Eighth National Engineering Symposium 1984.
Corsberg & Wilkie, "An Object–Oriented Alarm–Filtering System", presentation at the Sixth Power Plant Dynamics, Control and Testing Symposium, Knoxville, TN–Apr. 14–16, 1986.

(List continued on next page.)

*Primary Examiner*—Donnie L. Crosland
*Attorney, Agent, or Firm*—Hugh W. Glenn; Robert J. Fisher; Judson R. Hightower

[57] ABSTRACT

A functional relationship-based alarm processing system and method analyzes each alarm as it is activated and determines its relative importance with other currently activated alarms and signals in accordance with the functional relationships that the newly activated alarm has with other currently activated alarms. Once the initial level of importance of the alarm has been determined, that alarm is again evaluated if another related alarm is activated or deactivated. Thus, each alarm's importance is continuously updated as the state of the process changes during a scenario. Four hierarchical relationships are defined by this alarm filtering methodology: (1) level precursor (usually occurs when there are two alarm settings on the same parameter); (2) direct precursor (based on causal factors between two alarms); (3) required action (system response or action expected within a specified time following activation of an alarm or combination of alarms and process signals); and (4) blocking condition (alarms that are normally expected and are not considered important). The alarm processing system and method is sensitive to the dynamic nature of the process being monitored and is capable of changing the relative importance of each alarm as necessary.

29 Claims, 8 Drawing Sheets

OTHER PUBLICATIONS

Corsberg and Sebo, "A Functional Relationship Based Alarm Processing System for Nuclear Power", International ANS/ENS Topical Meeting on Operability of Nuclear Power Systems in Normal and Adverse Environments, Sep. 29–Oct. 3, 1986.

"Artificial Intelligence Applied to Process Signal Analysis", MASA Conf. on Artificial Intelligence for Space Applications, Huntsville, Ala. Nov. 1986.

"Extending an Object-Oriented Alarm-Filtering System", IEEE Sym. on Second Expert Systems in Government, Oct. 20–24, 1986.

FIG. 10A

| VESSEL DIFFERENTIAL PRESSURE HIGH-HIGH | VESSEL DIFFERENTIAL PRESSURE HIGH-LOW | VESSEL DIFFERENTIAL PRESSURE LOW-LOW | EXPERIMENTAL LOOP 1A MALFUNCTION | EXPERIMENTAL LOOP 1C-W MALFUNCTION |
| --- | --- | --- | --- | --- |
| INLET PRESSURE HIGH-HIGH | INLET PRESSURE HIGH-LOW | INLET PRESSURE LOW-LOW | EXPERIMENTAL LOOP 2A MALFUNCTION | EXPERIMENTAL LOOP 2B MALFUNCTION |
| OUTLET PRESSURE HIGH | EMERGENCY PUMP RECIRC. FLOW LOW | OUTLET PRESSURE LOW | EXPERIMENTAL LOOP 2C-S MALFUNCTION | EXPERIMENTAL LOOP 2D MALFUNCTION |
| VESSEL LEVEL LOW | VESSEL LEVEL LOW-LOW | MANUAL SCRAM | SEISMIC HIGH | RCCC POWER SUPPLY OVER/UNDER VOLTAGE |
| FIS VESSEL LOWER INJECTION | FIS VESSEL LEVEL LOW | FIS VESSEL UPPER INJECTION | 32 V DC DISTRIBUTION LOW VOLTAGE | 32 V DC DISTRIBUTION BREAKER TRIPPED |
| CHANNEL A | CHANNEL B | CHANNEL C | CHANNEL D | ESF 1 RELAYS LOSS OF VOLTAGE |
| DIVISION 1 LOGIC TRIPPED | DIVISION 2 LOGIC TRIPPED | DIVISION 3 LOGIC TRIPPED | DIVISION 4 LOGIC TRIPPED | DEPRESSURIZED MODE SELECTED |
| ESF 1 PRIMARY PUMP TRIP | ESF 4 PRIMARY PUMP TRIP | ESF 1 PRESSURIZING PUMP TRIP | ESF 4 PRESSURIZING PUMP TRIP | SCRAM |

Plant Status Printer

FIGURE 10A

| EXPERIMENTAL LOOP 1D MALFUNCTION | DIFFERENTIAL TEMPERATURE QUAD 1 HIGH | DIFFERENTIAL TEMPERATURE QUAD 1 HIGH-HIGH | DIFFERENTIAL TEMPERATURE QUAD 2 HIGH | EXPERIMENTAL LOOP 1C-W MALFUNCTION |
|---|---|---|---|---|
| EXPERIMENTAL LOOP 2C-E MALFUNCTION | DIFFERENTIAL TEMPERATURE QUAD 3 HIGH | DIFFERENTIAL TEMPERATURE QUAD 3 HIGH-HIGH | DIFFERENTIAL TEMPERATURE QUAD 4 HIGH | EXPERIMENTAL LOOP 2B MALFUNCTION |
| EXPERIMENTAL LOOP 2E MALFUNCTION | OUTLET TEMPERATURE HIGH | OUTLET TEMPERATURE HIGH-HIGH | INLET TEMPERATURE HIGH | EXPERIMENTAL LOOP 2D MALFUNCTION |
| PALM MALFUNCTION | NEUTRON LEVEL HIGH | NEUTRON LEVEL HIGH-HIGH | WIDE RANGE NEUTRON HIGH | WIDE RANGE NEUTRON HIGH-HIGH |
| 32 V CHARGER TROUBLE | FISSION BREAK HIGH ACTIVITY | FISSION BREAK HIGH-HIGH ACTIVITY | STACK DISCHARGE RADIATION HIGH | STACK DISCHARGE RADIATION HIGH-HIGH |
| ESF 4 RELAYS LOSS OF VOLTAGE | SAIS DETECTED PPS TROUBLE | SAIS TROUBLE | SURVEILLANCE FUNCTION DISABLED | BATTERY ROOM VENTILATION FAILURE |
| SHUTDOWN MODE SELECTED | ROD STRAP POWER ON | ROD STRAPPED | ROD STRAP POWER TROUBLE | PPS CABINET 1 HIGH TEMPERATURE |

Plant Alarm Messages
28

FIG. 10B

FUNCTIONAL RELATIONSHIP-BASED ALARM PROCESSING SYSTEM

CONTRACTUAL ORIGIN OF THE INVENTION

The United States Government has rights in this invention under Contract No. DE-AC07-76ID01570 between EG&G Idaho, Inc. and the U.S. Department of Energy.

This application is a continuation-in-part of application Ser. No. 037,897, filed on Apr. 13, 1987, by Daniel Robert Corsberg for "Functional Relationship-Based Alarm Processing", and assigned to the assignee of the present application.

BACKGROUND OF THE INVENTION

This invention relates generally to systems and methods for controlling a process and is particularly directed to the analysis of alarms in a process based upon the functional relationships that a newly activated alarm has with other currently activated alarms.

There are generally two types of methodologies in the handling of alarms in process control. One approach makes use of a predetermined, static ranking of the alarms. Thus, all of the alarms in the process are considered as a group and ranked according to their relative importance. These rankings are incorporated within an alarm system such that, no matter what the state of the process, an alarm will always be emphasized according to this predetermined set of rankings. While this methodology can be helpful, it is incapable of adjusting the importance of alarms based on the dynamics of the process being monitored. For example, the importance of any given alarm may be greater under one specific set of conditions and it would therefore be highly desirable to know when this alarm is activated under this specific set of conditions. Under another set of conditions the same alarm may be expected and might actually be the consequence of another alarm or of a process state. In these cases, the alarm should not be displayed at a very high level of importance since it is more of a status indicator than alarm condition.

Another methodology, which has not been widely accepted in industry, utilizes time-ordered sequences to determine the importance of alarms and to perform other diagnostic functions. In this approach, all possible (or likely) alarm activation sequences are identified and modeled. As a given scenario in the process being monitored develops, the alarm sequence is matched to the modeled sequences in attempting to identify what the current and future state of the process is or is likely to be. This approach is generally presented in the form of logic, or cause-consequence, trees. Unfortunately, these logic trees are difficult and expensive to develop and build, are generally inflexible to change, and are not easily maintained over the life of a plant. As a result, the logic tree approach to alarm analysis has been of limited use in real applications. Examples of the logic tree approach, particularly as applied to the environment of a nuclear power reactor, are: DMA (Diagnosis of Multiple Alarms), disclosed in an article by M. M. Danchak, entitled "Alarms Within Advanced Display Streams: Alternatives and Performance Measures", published in NUREG/CR-2276, EGG-2202, September 1982; STAR, disclosed in an article by L. Felkel, entitled "The STAR Concept, Systems to Assist the Operator During Abnormal Events," published in *Atomkernenergie, Kertechnik*, Vol. 45, No. 4, 1984, pp. 252-262; and DASS (Disturbance Analysis and Surveillance Systems), disclosed in an article by A. B. Long, R. M. Kanazava et al, entitled "Summary and Evaluation of Scoping and Feasibility Studies for Disturbance Analysis and Surveillance Systems (DASS)", published in Topical Report EPRI NP-1684, December 1980.

The present invention is intended to overcome the aforementioned limitations of the prior art by providing an alarm filtering or analysis methodology based upon the functional relationships of alarms which is not only sensitive to the dynamic nature of the process being monitored, but also is capable of changing alarm importances as necessary. The present invention utilizes artificial intelligence techniques and knowledge-based heuristics to analyze alarm data from process instrumentation and respond to that data according to knowledge encapsulated in objects and rules.

OBJECTS AND SUMMARY OF THE INVENTION

Accordingly, it is an object of the present invention to provide improved analysis of process control alarms in an operating system.

It is another object of the present invention to provide for the analysis of alarms in a process based upon functional relationships among alarms rather than in terms of a strictly time-dependent or static relationship.

Yet another object of the present invention is to provide an alarm signal filtering methodology based upon the relationships that a newly activated alarm has with other currently activated alarms.

A further object of the present invention is to provide an alarm analysis system and method based initially upon the relationships which the newly activated alarm has with other currently activated alarms followed by analysis of that alarm with respect to each subsequently activated or deactivated alarm.

A still further object of the present invention is to provide a functional relationship-based alarm filtering methodology and system which is responsive to the dynamic nature of the process being monitored and can change alarm importances as necessary.

Another object of the present invention is to provide artificial intelligence techniques, including object-oriented programming, in the analysis of alarms and alarm sequences in an operating system or process.

The present invention employs artificial intelligence techniques and knowledge-based heuristics to analyze alarm data from process instrumentation and respond to that data according to knowledge encapsulated in objects and rules. The system and method of the present invention filters alarm data, and the most important alarms and information are emphasized to operators during major transients. Alarms not applicable to current process modes are eliminated, while standing alarms resulting from maintenance or unusual operating conditions are inhibited and de-emphasized. Using functional relationships and hierarchical rulesets, the present invention:

Generates a description of a situation implied by combinations or sequences of alarms;

De-emphasizes display of information that confirms or is a direct consequence of a previously described situation; and Emphasizes alarms that do not fit previous conclusions or alarms that are expected (due to previous alarms or conditions) but are not received within specified time limits. These expected alarms are typically the result of automatic system response to a process state or operator action.

The analysis performed in carrying out the present invention is based on an understanding of functional relationships between alarms and states. Functional relationships are defined in terms of level precursors, direct precursors, required actions and blocking actions. Each type of relationship has a set of possible responses and decisions that can be made. This decision making knowledge is embodied in rules that are generic (in the sense that they do not address specific alarms or process states). These rules (and their knowledge content) remain unchanged during the development of a specific alarm processing approach regardless of the process with which the present invention is used. For example, the rules in alarm processing for a nuclear power plant would be identical to the alarm processing rules for a chemical processing plant.

The portions of the inventive alarm processing approach that are unique to the process being monitored are the objects representing the alarms and possible process states. Each object contains data about the specific entity that it represents. This separation of knowledge makes the present invention very versatile since alarms (or states) can be changed or added and not affect the structure of the decision-making mechanism; only the knowledge that the mechanism uses is affected.

Procedural, object-oriented and access-oriented, and rule-based programming paradigms are utilized in the present invention. The integration of these paradigms provides the present invention with a high degree of modularity and adaptability. Rules allow the capture and maintenance of heuristic knowledge about alarm relationships, while the object- and access-oriented programming allows each alarm's representation to act as an independent entity. An object can perform processing on its own, create new processes to analyze other portions of the system, or cause delayed processing to occur based on a temporal or event basis.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 10A and 10B illustrate an alarm display for use with the alarm processing system and method of the present invention as employed in a nuclear power test reactor;

DESCRIPTION OF PREFERRED EMBODIMENT

Figure 1:
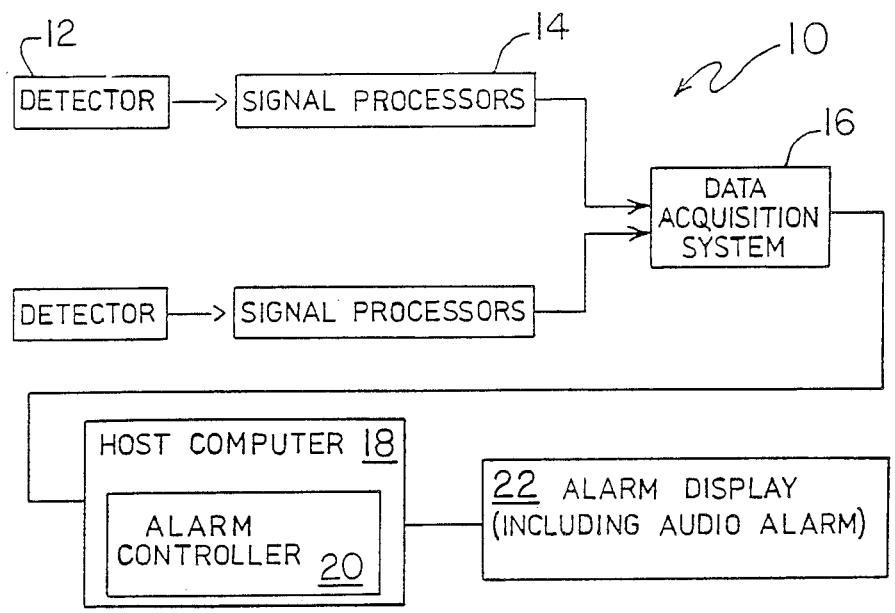
FIG. 1 is a simplified block diagram of a process monitoring system with which the functional relationship-based alarm processing system and method of present invention is intended for use.

Referring to FIG. 1, there is shown a simplified block diagram of a process monitoring system 10 in which the functional relationship-based alarm processing system and method of the present invention is intended for use. The process monitoring system 10 includes a plurality of detectors 12 for sensing various operating parameters of a process. Signals representing these operating parameters are provided from the various detectors 12 to a plurality of signal processors 14 for analysis of this operating data. The signal processors 14 analyze and process this operating data and provide this data to a data acquisition system 16 within the process monitoring system 10. Processing of the operating data within the various signal processors 14 may include the comparison of detector outputs to preset operating parameter limits, comparison of current with previously detected and stored operating parameter values, predictions of future operating parameter values, etc. This operating data is then provided from the data acquisition system 16 to a host computer 18 which includes an alarm controller 20 programmed to carry out functional relationship-based alarm processing in accordance with the present invention. The alarm controller 20 in a preferred embodiment is a microprocessor which forms a portion of the host computer 18. Output signals are provided by the host computer 18 in accordance with the manner in which the alarms are processed in the present invention to an alarm display 22 for providing a visual or aural indication to an operator monitoring the status of the process or operating system. An example of a visual alarm display used in one embodiment of the present invention is described below.

The present invention is implemented in Common-Lisp using several programming paradigms. The basic paradigm is object-oriented programming, which uses classes and objects to organize information. The present invention utilizes information about the plant, alarms, states, and display-oriented items consisting of the panel and the tiles on that panel as previously described. Each entity type is represented by a class, which, in turn, acts as a blueprint for building objects. Thus, while all objects in a class will have the same information structure because they were all built from the same blueprint, each object in a class has a different information content based on the specific item it represents.

As an example, a class is used as a blueprint for all the alarms in the plant, while each object in that class represents a single alarm. Table I shows the information structure associated with the alarm class and the information content associated with the alarm object InPressHiHiA, which represents the alarm "Inlet Pressure High-High (Channel A)." Table II shows the structure and data associated with the state object InPressHiHi-Trip, which represents the state "Inlet Pressure High-High Trip" (2:3 channels tripped).

TABLE I

| All Values of InPressHiHiA | |
| --- | --- |
| Identifier | InPressHiHiA |
| ApplicableModes | (Shutdown DePressurized Pressurized) |
| Status | #(Normal NIL Notify) |
| Alarm Tiles | (#$IPHHTTL3A) |
| LevelPrecursors | (InPressHiLoA) |
| DirectPrecursors | NIL |
| RequiredActions | NIL |
| WaitingEvents | NIL |
| ConnectedAlarms | NIL |
| Precursors | (#$InPressHiLoA) |
| Causes | NIL |
| StatesToNotify | (InPressHiHiTrip) |
| TextID | "Inlet Pressure High-High (A)" |

TABLE II

| All Values of InPressHiHiTrip | |
| --- | --- |
| Identifier | InPressHiHiTrip |
| LevelPrecursors | InPressHiHiC InPressHiHiB InPressHiHiA) |
| DirectPrecursors | NIL |
| Required Actions | NIL |
| ConnectedAlarms | NIL |
| Precursors | (#$InPressHiHiA #$InPressHiHiB #$InPressHiHiC) |
| Waiting Events | NIL |
| Causes | NIL |
| StateExpression | (GREATERP (FLENGTH &) 1) |
| TimeDelays | NIL |
| StatesToNotify | (ChannelsTripped HiPressScram) |
| TextID | "Inlet Pressure High-High Scram Condition" |

Using objects to represent the entities of the present invention has several advantages. By defining a class of objects to represent alarms, that representation is standardized, making the creation, modification, and referencing of each alarm easier. Since the information required for each alarm is clearly defined, its knowledge acquisition needs are also clearly defined. In addition, objects can communicate with each other by sending messages. This feature lends itself very well to making the present invention a data-driven system with objects investigating and communicating only with those directly related to the current situation. Finally, similar classes of objects can inherit procedures from each other, allowing them to respond to the same messages in a like fashion. The use of objects to represent the alarms and states increases the modularity of the knowledge base, allowing easy maintenance of the knowledge base over the life of the facility or the system (or process) being monitored.

The second major paradigm used in the present invention, that of rule-oriented programming, is used to represent and control the decision-making process. Approximately 45 rules are organized into hierarchical rulesets that allow knowledge processing to be modularized according to events and plant states. The rulesets are invoked by sending messages to and from objects (thus, using the object-oriented paradigm to control ruleset interactions). When invoked by an object, the ruleset examines that object's status as well as the status of functionally related objects to determine what action to take. No processing or rule checking is done that does not pertain to the immediate situation. The rules are generic in that they do not address specific alarms or plant states. For instance, the RawAlarm ruleset, which handles an activation signal from the plant instrumentation, is used by every alarm object in the system. One of the rules in the RawAlarm ruleset is:
IF (Alarm has both direct and level precursors)
THEN
 Send secondary messages to each valid level precursor.
 Send primary messages to each valid direct precursor.
 Send secondary message to self since have valid direct precursor.

This rule could be applied to any alarm object at any time but, in fact, is only applied to an alarm object when it first receives an activation signal from the plant. These rules were originally developed on a version of only 12 alarms and, because of their generic nature, have remained essentially the same throughout the growth and development of the present invention. Therein lies a key to the present invention's flexibility since new alarms and states do not change the decision-making process, only the knowledge that process utilizes.

The present invention contemplates analysis of each alarm as it is activated and determines its relative importance with other currently activated alarms and signals in order to determine that alarm's importance relative to the current state of the process as that state can be determined from available instrumentation. The method for determining the relative importance is based upon the relationships that the newly activated alarm has with other currently activated alarms. Once the initial level of importance has been determined, that alarm will again be evaluated if another related alarm is activated or deactivated. Thus, each alarm's importance is continuously updated as the state of the process changes during a scenario.

Figure 2:
FIGS. 2-9 illustrate in simplified block diagram form the functional relationships among various alarms defined in accordance with the alarm processing carried out by the present invention.
Figure 3:
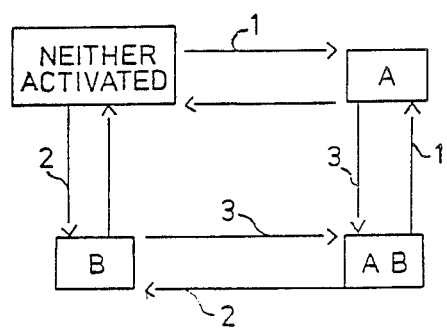

The first relationship among alarms used in the present invention is Level Precursor as shown in FIG. 2, which usually occurs when there are two alarm setpoints on a single parameter. If alarm A is a level precursor of alarm B, then A should occur before B. Thus, alarm A might be activated at 10 psi, while alarm B might be activated at 20 psi. Alarm A would therefore be a Level Precursor to Alarm B, meaning that if both A and B are activated, A will be de-emphasized relative to B. The various rules applicable to Level Precursors are as follows, with these rules illustrated by their associated numbers in simplified block diagram form in FIG. 3:
Rule 1:
 If only A is activated, then A will be displayed as primary.
Rule 2:
 If only B is activated, then B will be displayed as primary, with a message provided to the alarm display indicating that A is expected prior to B.
Rule 3:
 If both A and B are activated, then A will be secondary and B will be primary.

Figure 4:
Figure 5:
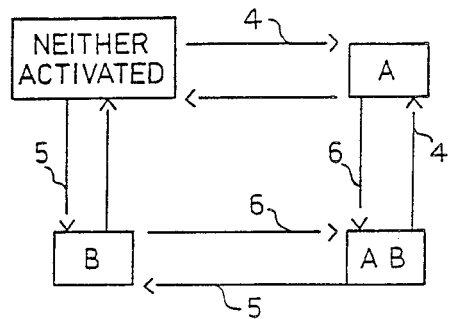

The next relationship between alarms used in the present invention is Direct Precursor which is based on causal factors between the two alarms as shown in FIG. 4. Given that alarm A is a Direct Precursor of alarm B, then not only should A occur before B, but A's occurrence can cause B's occurrence. Thus, if alarm A is a possible cause for the activation of alarm B, then if both alarms are activated, alarm B will be de-emphasized relative to alarm A. Defining these relationships between alarms A and B is set forth in the following rules 4, 5 and 6 and is illustrated in simplified block diagram form in FIG. 5 where the numbers indicated therein represent a respective one of the following rules:

Rule 4:
  If only A is activated, then A will be displayed as primary.
Rule 5:
  If only B is activated, then B will be displayed as primary.
Rule 6:
  If both A and B are activated, then A will be primary and B will be secondary.

Figure 6:
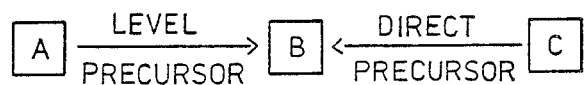

Even when an alarm is emphasized by one relationship, it may be de-emphasized by another. This de-emphasis takes precedence until the reason for the de-emphasis disappears. Take for example the case where alarm A is a Level Precursor to alarm B and alarm C is a Direct Precursor to alarm B as illustrated in FIG. 6. This situation is guided by the following two rules:
Rule 6a:
  If A and B are activated and C is not activated, then B is primary and A is secondary.
Rule 6b:
  If A, B and C are all activated, then C is primary and A and B are secondary.

Figure 7:
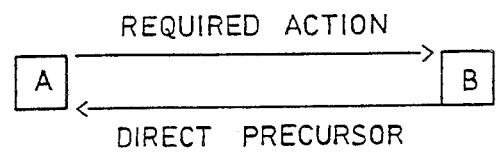

The third alarm relationship defined in the present invention is High Priority Required Actions. This relationship generally occurs when there is some automatic system response or procedural requirement for operator response to a specific plant or process event or state. Thus, if alarm A is a required action of alarm B, then when B occurs, A had better follow. Examples of this alarm relationship would be a scram, or automatic shutdown, alarm based on 2:3 logic on a shutdown parameter; a valve operation following the closing or opening of a handswitch operator for the valve; or a procedural requirement for an operator to shut a valve following a loss of vacuum in a condenser. Since in this relationship alarm A is a high priority required action of alarm B, then by definition B is a Direct Precursor of A. Thus, the display of A and B when they are activated (together or individually) is illustrated in FIG. 7 and is described above in terms of the Direct Precursor alarm relationship. The High Priority Required Actions relationship is generally time dependent and is typically concerned with the situation where alarm B is activated and alarm A does not occur within a specified time interval. This alarm relationship must also take into consideration the proper response when either alarm A or alarm B clears.

Figure 8:
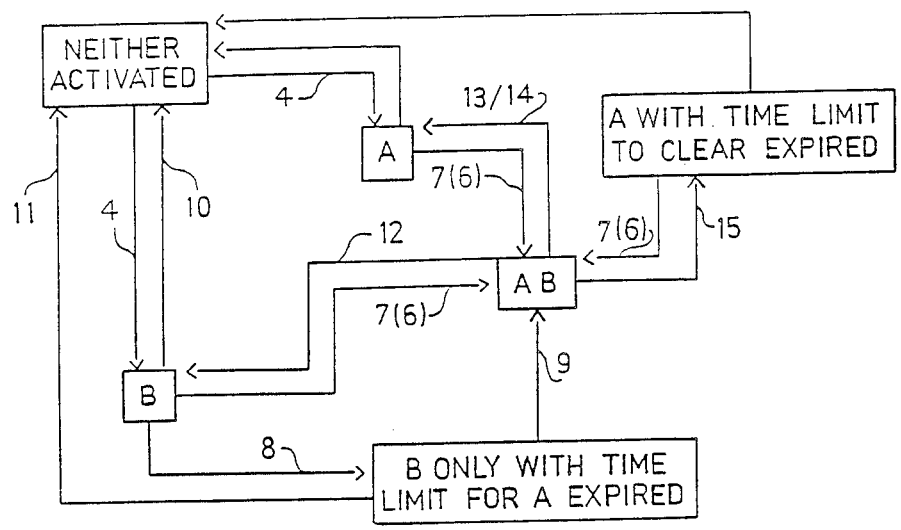

Processing of alarms in accordance with the present invention includes the assumption that if alarm B is activated, then alarm A should be activated. In other words, alarm processing in the present invention waits for the same period of time as when alarm B was initially activated. At the end of this time interval, if alarm B is still activated and alarm A is not, then alarm A will be considered as missing. If alarm B clears before alarm A clears, then one of several responses may be warranted, all of which can be implemented in the present invention. It may be that once alarm B has cleared, alarm A should be immediately re-evaluated to determine its importance relative to the current set of activated alarms. In other situations it may be appropriate to wait for a specified amount of time prior to re-evaluating alarm A's importance. Finally, it may be that alarm A should be left as secondary for the remainder of the time period that it is activated. The rules applying to the High Priority Required Actions alarm relationship between alarms A and B are graphically summarized in FIG. 8 and are listed as follows:

Rule 7:
  If B is activated and A is activated within the time limit, then B will be primary and A will be secondary.
Rule 8:
  If B is activated and A is not activated within the time limit, then send message to alarm display stating that A was expected within X seconds of B. A is emphasized to highest level possible.
Rule 9:
  If B is activated and A is not activated within time limit and A is then activated, then A will be secondary and B will be primary, and B's display will be unchanged.
Rule 10:
  If B is activated and B is then cleared prior to time limit for A, then no action is taken.
Rule 11:
  If B is activated and A is not activated within time limit and B is then cleared, then A's display is cleared.
Rule 12:
  If A and B are activated and A then clears, then situation is treated as if B has just been activated and response is in accordance with Rules 7–11.
Rule 13:
  If A and B are activated and B is cleared and there is no time limit for A to clear, then A remains secondary.
Rule 14:
  If A and B are activated and B is cleared and time limit has not expired for A to clear, then A remains secondary.
Rule 15:
  If A and B are activated and B is then cleared and the time limit for A to clear expires, then A is re-evaluated according to the current set of activated alarms.

Figure 9:
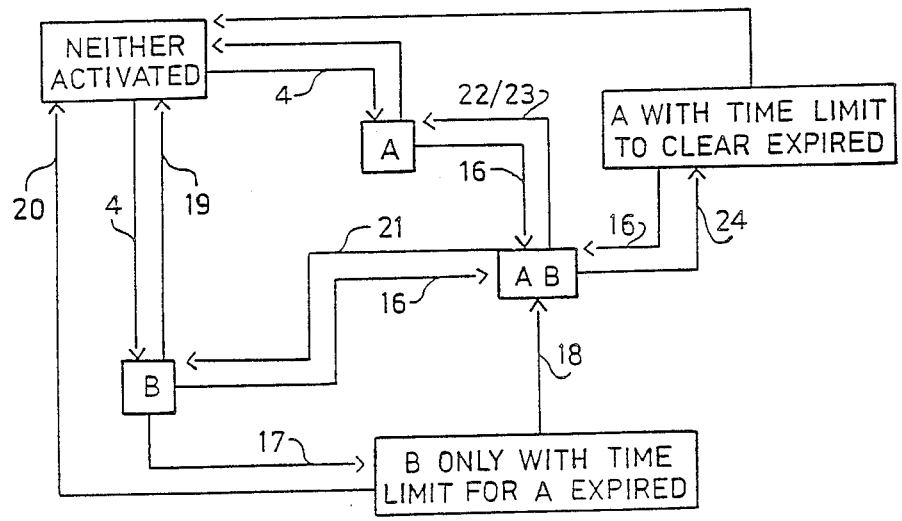

Another alarm relationship used in the present invention is termed Low Priority Required Actions and is very similar to the high priority required actions relationship except that the level of emphasis concerning the missing action is not as high. In fact, a major indication provided to an operator or one monitoring the process is simply a visual message typically provided by a printer. Thus, this alarm relationship is also illustrated by FIG. 7, where alarm A is a low priority required action of alarm B. Since alarm A is a required action of alarm B, then by definition alarm B is a Direct Precursor of alarm A. Thus, the display of alarms A and B when they are activated, either together or individually, is as set forth above in the explanation of the Direct Precursor alarm relationship. The low priority required actions time-dependent relationship is mainly concerned with the situation where alarm B is activated and alarm A does not occur within a specified time interval. The question which must be answered in this alarm relationship is how to properly respond when either alarm clears. The present invention addresses this situation for low priority required actions in the same way as higher priority required actions as outlined in the following Rules 16–24 and as illustrated in the block diagram of FIG. 9.
Rule 16:
  If B is activated and A is activated within the time limit, then B will be primary and A will be secondary.
Rule 17:

If B is activated and A is not activated within the time limit, then send message to alarm display that A was expected within X seconds of B.

Rule 18:
If B is activated and A is not activated within the time limit and A is then activated, then A will be secondary and B will remain unchanged.

Rule 19:
If B is activated and B is then cleared prior to time limit for A, then no action is taken.

Rule 20:
If B is activated and A is not activated within the time limit and B is then cleared, then no effect on A's display.

Rule 21:
If A and B are activated and A then clears, then this situation is considered as B just having been activated and response is in accordance with Rules 16–20.

Rule 22:
If A and B are activated and B is cleared and there is no time limit for A to clear, then A remains secondary.

Rule 23:
If A and B are activated and B is cleared and time limit has not expired for A to clear, then A remains secondary.

Rule 24:
If A and B are activated and B is then cleared and time limit for A to clear expires, then A is re-evaluated according to the current set of activated alarms.

The final alarm relationship utilized in the present invention is a Blocking Condition which is designed to affect the display of an alarm. The manner in which the display is affected depends upon the process with which the alarm processing approach of the present invention is used. The Blocking Condition is generally used to de-emphasize the display of an alarm (sometimes to the point of not displaying the alarm at all) based upon some process condition, although the alarm still appears activated. For example, where alarm A is a blocking condition for alarm B and with alarms A and B both activated, the display of alarm B will remain unchanged and no processing of alarm B's relationships will occur until alarm A clears. The rules implemented in carrying out the Blocking Condition are set forth as follows:

Rule 25:
If only A is activated, then A will be processed and displayed according to its relationships to other activated alarms.

Rule 26:
If only B is activated, then B will be processed and displayed according to its relationships to other activated alarms.

Rule 27:
If both A and B are activated, then B's display will be blocked and A's display will remain the same as in Rule 25.

In the following paragraphs implementation of the functional relationship-based alarm processing approach of the present invention in the Advanced Test Reactor (ATR) at the Idaho National Engineering Laboratory is described in detail. Referring to FIGS. 10A and 10B, there is shown an alarm display 22 used in a preferred embodiment of the present invention when employed with the ATR. The alarm display 22 includes a plurality of alarm tiles in a rectangular matrix array together with first and second text windows 26, 28. The first text window 26 labeled "Plant Status Printer" represents a printer having an output which would typically be reviewed by an operator after the fact to analyze what happened and check for proper system response. The second text window 28 labeled "Plant Alarm Messages" represents the output to a plant operator that would be immediately available at the time of a transient. The second text window 28 thus would typically be in the form of a console centrally located in the control display system of the ATR.

When an alarm is identified as a primary cause, its tile is illuminated red, while an alarm identified as a precursor to or a consequence of a primary cause has its tile illuminated yellow. The configuration of the alarm display 22 illustrated in FIGS. 10A and 10B corresponds to its appearance following a low pressure scram sequence in the ATR. The primary alarm (Inlet Pressure High-High) is the cause of the scram sequence as emphasized by the color of alarm tile 24 as well as by an audio alarm. The secondary alarms which are suppressed in gray in the figure (stippled alarm tiles) are either precursors (Inlet Pressure High-Low) or direct consequences (Scram) of the Inlet Pressure High-High trip. The remaining display levels deal with expected alarms and utilize both the tile display as well as the first and second text windows 26 and 28.

Once an initiating event has occurred, automatic system response becomes of paramount importance in many alarm sequences. If an automatic function does fail, an operator must recognize that failure and take some action to return the plant to a safe condition. The present invention thus defines a set of plant states and expected responses to those states. When one of these responses fails to occur, the present invention generates a special high level alarm message that is sent to the Plant Alarm Messages Window 28. The messages pertaining to the expected alarm remains on the window until the arrival of the expected alarm signal from the plant. This ensures the visual emphasis of the information which demands action on the part of the operator. In the example illustrated in FIGS. 10A and 10B, if a scram did not occur after all the conditions had been met for a scram, a special high level message indicating that fact is sent to the Plant Alarm Messages Window 28.

In some cases, a missing alarm is not particularly important to the operator at the time of a transient. For example, in the ATR all four division logics should trip when a scram condition occurs. If one fails to trip, the scram would still take place and the operator would probably not care to see a message concerning the failed division logic while trying to recover the plant from the transient. In this case, the operating system would leave the associated alarm tile in a normal state and would send a message to the Plant Status Printer 26 stating that the logic trip had failed to occur as expected.

The least stringent of the functional relationships is that of the level precursors. In the following discussion which provides an example of the use of the present invention in ATR, the letters X, Y and Z refer to either an alarm or a state. If X is a level precursor of Y, then X should occur before Y. However, X's occurrence does not imply the occurrence of Y. For example, the high pressure alarm (InPressHiHiA-vessel inlet pressure high at 250 psi) should occur prior to the high-high pressure trip (InPressHiHiTrip-vessel inlet pressure high-high at 280 psi). However, the occurrence of the high pressure alarm does not always mean the high-high pressure trip will occur since the pressure could stabilize below 280 psi.

Direct precursors are similar to level precursors but have one important difference. Given that Y is a direct precursor of Z, then not only should Y occur before Z, but Y's occurrence can cause Z's occurrence. Thus, if Z occurs and Y has already occurred (or occurs in the future), Z will know that it is a consequence of Y. This direct implication is very important in determining primary causal alarms. If all three alarms have occurred, it will be determined that X is not a primary causal alarm because it is a level precursor of Y. In turn, Z is not a primary causal alarm because it has a valid direct precursor (Y), which implies that Z is the result of Y. Hence, Y is determined by the primary causal alarm. In general, missing level or direct precursors are treated with a low priority by sending a message to the plant status printer 26. In the case of required actions, if Y is a required action of X, then when X occurs Y had better follow. An example of this in the ATR can be illustrated with the DLTsTripped and SCRAM alarms. The DLTsTripped state (2:4 sets of division logics are tripped) and the SCRAM (indicating a scram has occurred) alarm serve as examples of both a direct precursor and a required action. DLTsTripped is a direct precursor to a SCRAM. Thus, if a scram occurs, the present invention will be looking to see if DLTsTripped is true. From the opposing point of view, SCRAM is a required action of DLTsTripped. Thus, when two division logics are recognized as being tripped, the present invention will be looking for the SCRAM alarm. If a required action does not take place, an operator is notified by a special message on the Plant Alarm Message Window 28.

Figure 11:
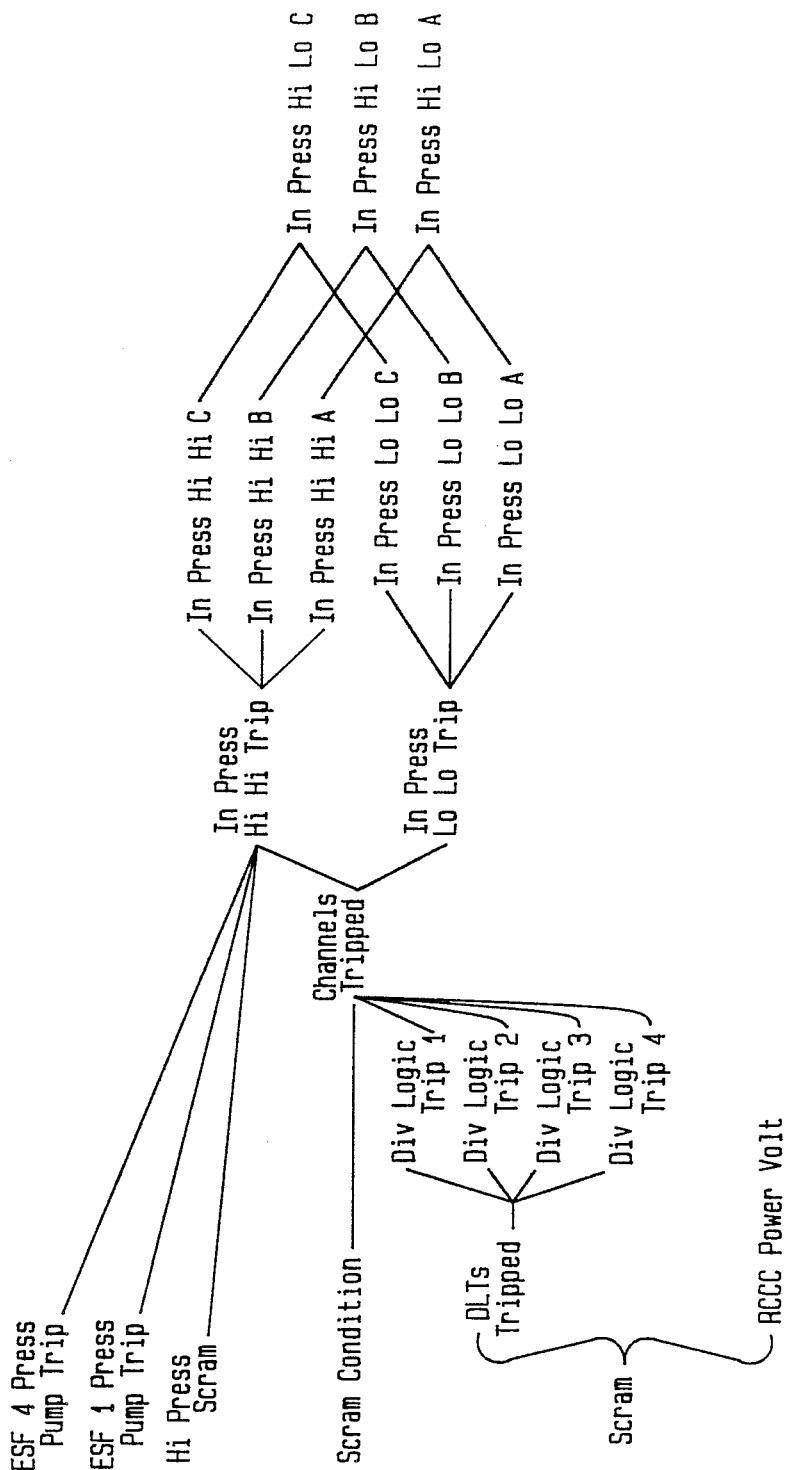
FIG. 11 illustrates the precursor relationships of some of the 200 alarms and states used in the functional relationship-based alarm processing system and method of the present invention as utilized in a nuclear power test reactor.

FIG. 11 illustrates the precursor relationships of some of the 200 alarms and states used by the present invention in ATR. Each link in the graph represents either a level or a direct precursor. For example, the link between SCRAM and DLTsTripped represents the direct precursor relationship discussed above.

Figure 12:
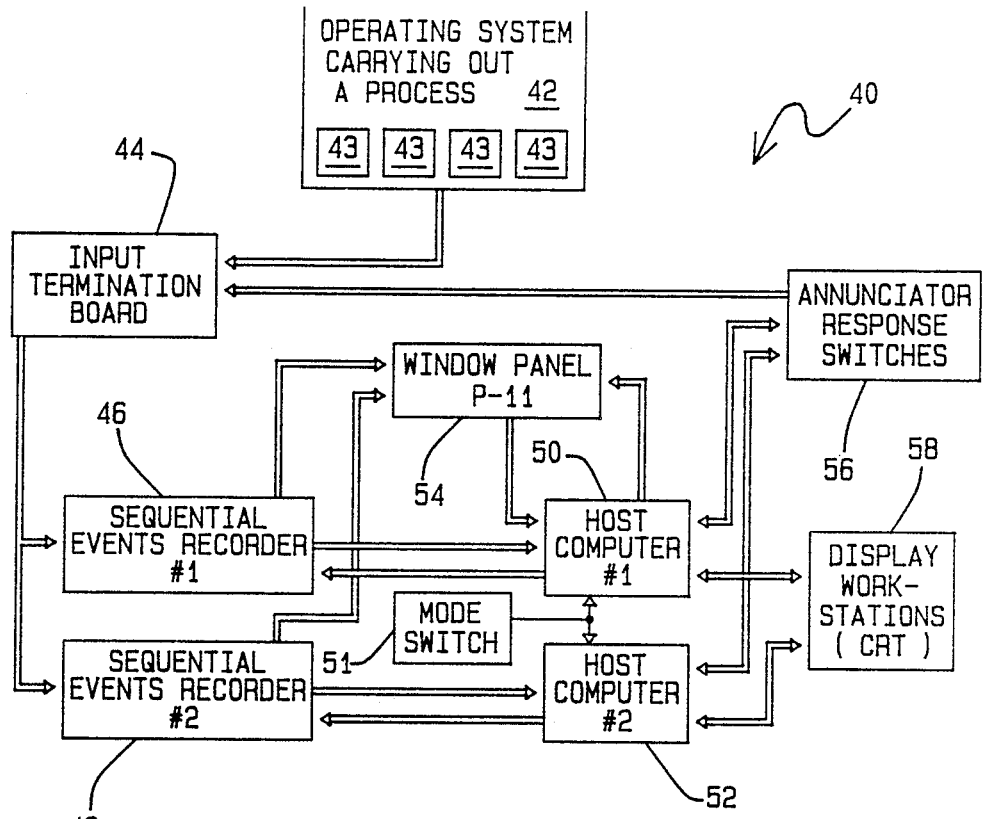
FIG. 12 is a simplified block diagram of a functional relationship-based alarm processing system in accordance with the present invention.

Referring to FIG. 12, there is shown in simplified block diagram form a functional relationship-based alarm processing system 40 in accordance with the present invention. The alarm processing system 40 includes an operating system 42 carrying out a given process, which in a preferred embodiment of the present invention is a nuclear power generating reactor, although the present invention is not limited to this type of operating system The operating system 42 includes a plurality of detectors 43 for sensing various operating parameters of the process being carried out by the operating system. The signals representing these operating parameters are provided from the various detectors 43 to first and second sequential events recorders (SERs) 46, 48 via an input terminal board 44. Each of the detectors 43 typically includes a bistable circuit which monitors an operating parameter of the process and provides a binary input representing the operating parameter to the aforementioned first and second SERs 46, 48.

Figure 13:
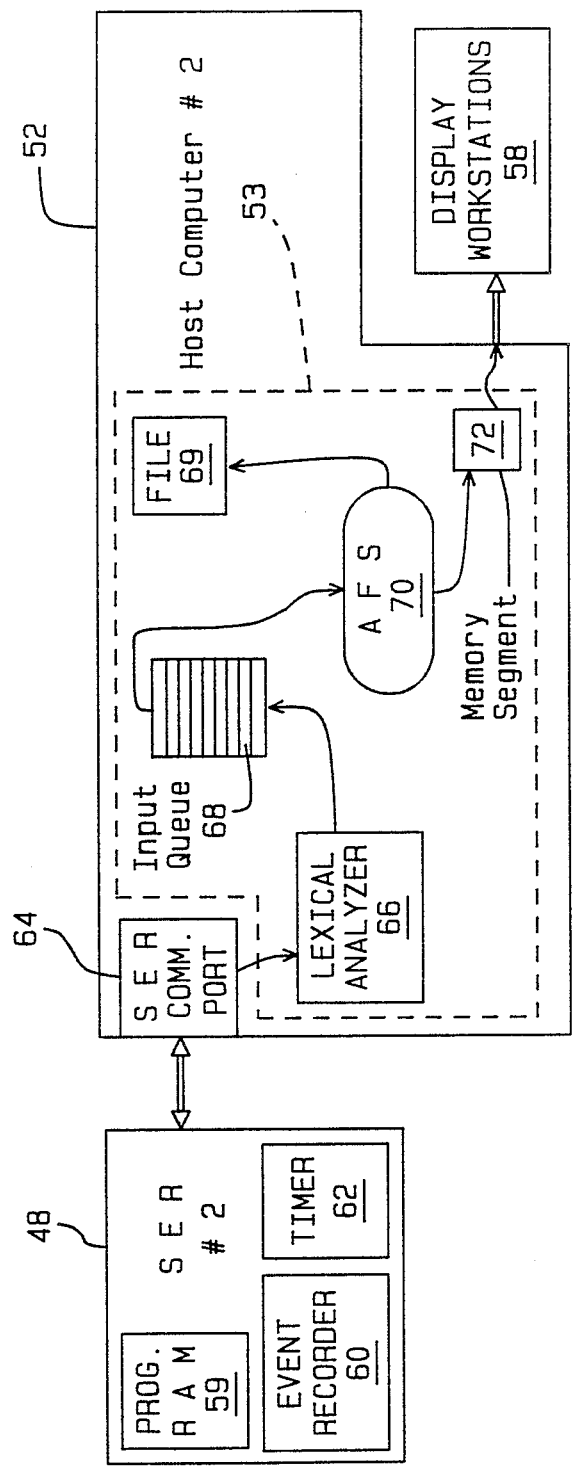
FIG. 13 is a simplified block diagram and flow chart illustrating in greater detail the configuration of the sequential events recorder and host computer portions of the functional relationship-based alarm processing system illustrated in FIG. 12.

Each of the SERs 46, 48 in a preferred embodiment is a Model Betalog 512 available from Beta Products of Carrollton, Tex. Each of these SERs includes a plurality of central processing units (CPUs), microprocessors, buffer memories, and output ports. Additional details of the second SER 48 are shown in FIG. 13 together with additional details of the second host computer 52. The additional components of the second SER 48 illustrated in FIG. 13 include a programmable random access memory (RAM) 59, an event recorder 60, and a timer 62. The additional details of the second SER 48 and the second host computer 52 illustrated in FIG. 13 are equally applicable to the first SER 46 and the first host computer 50, respectively.

Each of the first and second SERs 46, 48 monitors a plurality of input channels from the various detectors 43 and provides an appropriate output to its associated host computer upon a change of state of one of input alarm signals received by the sequential recorder. Thus, a change in state of an alarm input to the second SER 48 will be recorded in its event recorder 60, with the time of the state change determined to within one millisecond by the timer circuit 62. Each SER thus has its own event recorder as well as master clock, or timer, for recording the occurrence of a change in state of one of the binary outputs from the detectors 43. The Model Betalog 512 is capable of monitoring 425 channels and of determining and recording the time of a state change to within a resolution of one millisecond.

Upon detection of a state change by the first and second SERs 46, 48, an appropriate output signal is provided to one of a plurality of windows, or annunciator panels, 54 to provide a visual indication of a state change in one of the detectors 43. Upon detection of a change in state of one of the binary outputs from one of the detectors 43, each of the first and second SERs 46, 48 also provide a corresponding output to the first and second host computers 50, 52, respectively. The combination of the first and second SERs 46, 48 and first and second host computers 50, 52 provides redundancy in the functional relationship-based alarm processing system 40 for improved reliability and is not essential for proper operation of the present invention. Thus, the present invention will operate equally well with the combination of a single SER and host computer.

The window panel 54 is comprised of a plurality of annunciator tiles as shown in FIGS. 10A and 10B which illuminate in response to an appropriate output signal from the first and second SERs 46, 48 to indicate a change in state of one of the bistable detectors 43. Each of the first and second SERs 46, 48 contains a programmable RAM, shown in the case of the second SER as element 59 in FIG. 13. The programmability of each of the SERs allows these event recorders to accommodate changes in the processing of alarm outputs from the operating system for detection and recording purposes.

The first and second host computers 50, 52 are Hewlett-Packard 9000/350 computers in a preferred embodiment. The host computers receive alarm information from the first and second sequential events recorders 46, 48, process this alarm information in accordance with a software program stored in each of the host computers, and output alarm data to a plurality of display work stations, or alarm display consoles, 58. Each of the display work stations includes a cathode ray tube (CRT) for the display of alarm information in a wide range of presentations and display arrangements.

Referring specifically to FIG. 13, the configuration and operation of the second host computer 52 will now be described in detail, it being understood that the following discussion is equally applicable to the first host computer 50. The second host computer 52 is coupled to and receives alarm information from the second SER 48. Alarm data from the second SER 48 is provided to a serial communications port 64 and thence to a programmable random access memory (RAM) 53 within the second host computer 52. RAM 53 contains an operating program for carrying out the functional relationship-based alarm processing of the present invention. The program stored in the RAM 53 is typically loaded into the host computer 52 from a storage disc. Timing information as well as alarm occurrence information is provided to the RAM 53 from the second SER 48 via the serial communications port 64.

Each of the first and second host computers 50, 52 includes other components not shown in the figures which are incorporated in any such conventional microprocessor or microcomputer. These components include a CPU (Motorola 68020), a clock, an arithmetic and logic unit (ALU), an accumulator and a read only memory (ROM). These components are managed by an operating system which is the HP-UX version 6.0 operating system in a preferred embodiment. Each of the host computers stores instructions and data, periodically updates the stored data, compares both stored and real-time data and makes decisions based upon these comparisons by means of logic instructions stored in its ROM in providing control over the functional relationship-based alarm processing system. The ROM typically is a programmable, nonvolatile, factory produced memory matrix which includes a plurality of memory locations or "bytes" of 8 bits each.

An external crystal oscillator circuit, also not shown, provides timing signals to a clock within the host computer for controlling the timing of the operations carried out by the host computer. The host computer's controller is responsive to instructions read from the ROM and directs the ALU to perform various arithmetic operations in accordance with these instructions with respect to data stored in its RAM 53 and to real-time data provided to the host computer from one of the SERs.

In the host computer's RAM 53 is stored the operating program for prioritizing the various alarms on a functional basis as previously described. Alarm information is provided from the serial communications port 64 to a lexical analyzer 66 within the RAM 53. The lexical analyzer 66 looks at the alarm information for certain sequences or patterns of characters. Lexical analyzer 66 operates as a software process in removing designated character strings within the sequence of characters in the data provided from the second SER 48 via the serial communications port 64 to RAM 53. When the lexical analyzer 66 recognizes a designated character string representing an alarm signal, it removes this character string and provides it to an input queue 68 within the host computer's RAM 53.

The input queue 68 also is a software routine which functions like a stack of messages. Each message which is received by the input queue 68 from the lexical analyzer 66 is put at the bottom of the stack and is sequentially moved through the input queue to be removed therefrom by an alarm filtering subroutine (AFS) 70 within the host computer's RAM 53. The alarm data is thus read from the input queue 68 by the AFS 70 in a first in/first out (FIFO) manner. If the input queue 68 does not contain any alarm messages, the AFS 70 waits for the next alarm data to be read into the input queue and subsequently reads this data from the input queue. The alarm relationships previously described are stored in the AFS 70 which processes the alarm data received from the various detectors in accordance with these alarm relationships and provides an appropriate output to a memory segment 72 within the host computer's RAM 53. Also stored in the AFS 70 is the current state of each of the alarms as received by the second host computer 52 from the second SER 48.

The memory segment 72 is a data structure which contains the priority assigned to a given alarm that is to be displayed. The memory segment 72 also stores time information relating to the last time a given alarm changed state. The memory segment 72 reads alarm information stored in and alarm data received by the AFS 70 and provides this information to the various display work stations 58 in accordance with the program stored in the AFS.

The second host computer 52 also contains in its RAM 53 a file 69 which is coupled to the AFS 70 for recording sequential events, the state of each of the alarms, the name of a given alarm, and the time, or occurrence, at which a given alarm changes state. The file 69 thus serves as a data storage tank which may also be coupled to the display work stations 58, or to another peripheral such as a printer, for providing past operating data for long term system monitoring purposes.

The functional relationship-based alarm processing system 40 also includes a plurality of annunciator response switches 56 coupled to the input terminal board 44 as well as to the first and second host computers 50, 52. A first annunciator response switch is engaged by an operator when an alarm occurs in order to acknowledge actuation of the alarm. Selection of the first annunciator response switch terminates the alarm, which may be both visual and aural. In one embodiment, selection of the first annunciator response switch terminates the audio alarm and causes the visual alarm indicator to stop flashing and to go to continuous illumination. This first annunciator response switch is termed the "ACKNOWLEDGE" button, while a second "RESET" annunciator response switch subsequently selected allows the alarm to be reset causing the steady illuminated visual alarm signal to turn off. The functional relationship-based alarm processing system 40 further includes a mode switch 51 coupled to the first and second host computers 50, 52 which indicates to the host computers which operating state the operating system 42 is in. For example, where the operating system is a power generating nuclear reactor, the mode switch 51 would indicate to the first and second host computers 50, 52 that the operating system is shutdown, depressurized, pressurized, etc.

Another relationship incorporated into the present invention is the first-out relationship. This relationship uses temporal as well as logic information in determining what should be emphasized. It is used when the first activated alarm in a group should be emphasized and all subsequently activated alarms should be deemphasized. When the first alarm clears, the next still activated alarm is emphasized. This relationship is known and used in industry today, although it has not yet been integrated into the AFS approach. The following specifies the rules used for the first-out relationship:

Given that alarms A, B, C, and D are designated as a first-out group of alarms.
Rule 28:
  If (Only one alarm in group is activated)
    Then (That alarm will be processed according to rules from other relationships. If none exist, it would be displayed as primary).
Rule 29:
  If (More than one alarm in group is activated)

Then (The first alarm that was activated is processed as in Rule 28. All subsequent alarms from group are deemphasized).

Rule 30:
If (The first activated alarm clears) AND (Other alarms from the group remain activated)
Then (The first alarm that occurred from those remaining activated will be processed according to Rule 28. All other activated alarms from group will be deemphasized).

There has thus been shown a functional relationship-based alarm processing approach which initially evaluates each alarm in terms of its relative importance by comparing it with currently activated alarms. Once the initial level of importance of an alarm has been determined, that alarm will again be evaluated if another related alarm is activated or deactivated. Thus, each alarm's importance is kept updated as the state of the process changes during the scenario. The present invention makes use of four basic relationships between alarms and either displays or does not display an activated alarm based upon which alarms have been previously activated and the relationships which the present alarm has with the previously activated alarms. Although described herein for use in a nuclear power plant, the generic nature of the underlying technology of the present invention allows it to be easily adapted to other processes. For example, the present invention is currently being installed in the Fluorine Dissolution and Fuel Storage Facility (FAST) at the Idaho National Engineering Laboratory in Idaho Falls, Id. By integrating rule-oriented programming into an object-oriented environment, exhaustive searches of extensive databases or structures is avoided in the high speed processing of large numbers of process alarms. Since the only rules checked (and the only objects referenced) are those directly related to the event being processed, the computational requirements per event encountered in carrying out the present invention are not dependent upon the alarm space size, but rather upon the relational complexity of those alarms. The use of an object-oriented alarm model ensures a high degree of flexibility for the present invention which is easily adapted to subsequent modifications of the process with which it is integrated.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A system for monitoring a process characterized by a plurality of process alarms A and B each representing a respective operating state of said process as of primary importance or of secondary importance based upon functional relationships among said alarms, said system comprising:
   a plurality of detectors each responsive to a respective process alarm;
   recording means coupled to said plurality of detectors for recording the occurrence of an alarm; and
   signal processing means coupled to said recording means and responsive to the occurrence of an alarm recorded therein for evaluating the operating state of the process and assigning an importance to its associated alarm by defining each of the alarms A and B in terms of one of the following relationship categories:
   alarm A is a level precursor of alarm B such that alarm A should occur before alarm B;
   alarm A is a direct precursor of alarm B such that alarm A should occur before alarm B and alarm A's occurrence implies alarm B's occurrence;
   alarm A is a priority required action of alarm B such that occurrence of alarm B should cause the activation of alarm A; or
   alarm A is a blocking condition for alarm B such that, with both alarms A and B activated, alarm B will not be processed until alarm A is no longer activated, or clears; and
   wherein primary importance is assigned to an activated alarm and secondary importance is assigned to that alarm which is not activated when one of the alarms is activated and the other alarm is not activated, and, where both alarm A and alarm B are activated, assigning primary importance to alarm B and secondary importance to alarm A where alarm A is a level precursor of alarm B or assigning primary importance to alarm A and secondary importance to alarm B for the remaining relationship categories between alarms A and B.

2. The system of claim 1 further comprising display means coupled to said signal processing means for displaying the alarm designated as being of primary importance.

3. The system of claim 1 further comprising mode switch means coupled to said signal processing means for displaying the alarm designated as being of primary importance in a first display mode and displaying the alarm designated as being of secondary importance in a second display mode, where said first display mode is more pronounced than said second display mode.

4. The system of claim 1 where alarm A is a level precursor of alarm B and wherein only alarm B is activated, said system further comprising display means coupled to said signal processing means for providing an indication that alarm A is expected prior to alarm B.

5. The system of claim 1 where alarm A is a level precursor of alarm B and an alarm C is a direct precursor to alarm B, wherein alarms A and B are activated and alarm C is not activated, with primary importance assigned by said signal processing means to alarm B and secondary importance assigned to alarm A.

6. The system of claim 1 where alarm A is a level precursor of alarm B and an alarm C is a direct precursor to alarm B, wherein alarms A, B and C are activated, with primary importance assigned by said signal processing means to alarm C and secondary importance assigned to alarms A and B.

7. The system of claim 1 where alarm A is a priority required action of alarm B such that activation of alarm A is expected within a predetermined time interval of the activation of alarm B, wherein alarm B is activated and alarm A is activated within said predetermined time interval, with said signal processing means assigning primary importance to alarm B and secondary importance to alarm A.

8. The system of claim 1 where alarm A is a priority required action of alarm B such that activation of alarm A is expected within a designated time interval of the activation of alarm B, wherein alarm B is activated and alarm A is not activated within said predetermined time interval, with said signal processing means assigning primary importance to alarm B.

9. The system of claim 8 further comprising means for providing an indication that alarm A was expected within said predetermined time interval of the activation of alarm B.

10. The system of claim 9 wherein a highest level of importance is assigned to alarm A by said signal processing means.

11. The system of claim 1 where alarm A is a priority required action of alarm B such that activation of alarm A is expected within a designated time interval of the activation of alarm B, wherein alarm B is activated and alarm A is activated after said predetermined time interval, with said signal processing means assigning primary importance to alarm B and secondary importance to alarm A.

12. The system of claim 1 where alarm A is a priority required action of alarm B such that activation of alarm A is expected within a designated time interval of the activation of alarm B, wherein alarm A is inactive and alarm B is activated followed by de-activation of alarm B during said designated time interval, with said signal processing means maintaining alarms A and B with their respective current levels of importance.

13. The system of claim 1 where alarm A is a priority required action of alarm B such that activation of alarm A is expected within a designated time interval of the activation of alarm B, wherein alarm B is activated and alarm A is not activated within said designated time interval followed by de-activation of alarm B, with said signal processing means de-activating alarm A.

14. The system of claim 1 wherein alarm A is a priority required action of alarm B such that activation of alarm A is expected within a designated time interval of the activation of alarm B, wherein alarms A and B are activated followed by de-activation of alarm A and re-activation of alarm A within said designated time interval, with said signal processing means assigning primary importance to alarm B and secondary importance to alarm A.

15. The system of claim 1 where alarm A is a priority required action of alarm B such that activation of alarm A is expected within a designated time interval of the activation of alarm B, wherein alarms A and B are activated followed by de-activation of alarm A and wherein alarm A is not re-activated within said designated time interval, with said signal processing means assigning primary importance to alarm B.

16. The system of claim 15 further comprising means for providing an indication that alarm A was expected within said predetermined time interval of the activation of alarm B.

17. The system of claim 16 wherein a highest level of importance is assigned to alarm A by said signal processing system.

18. The system of claim 1 where alarm A is a priority required action of alarm B such that activation of alarm A is expected within a designated time interval of the activation of alarm B, wherein alarm B is activated and alarm A is activated after said designated time interval, with said signal processing means assigning primary importance to alarm B and secondary importance to alarm A.

19. The system of claim 1 where alarm A is a priority required action of alarm B such that activation of alarm A is expected within a designated time interval of the activation of alarm B, wherein alarms A and B are activated followed by de-activation of alarm B and failure of alarm A to de-activate within said designated time interval, with said signal processing means assigning secondary importance to alarm A.

20. The system of claim 1 where alarm A is a priority required action of alarm B such that activation of alarm B is expected within a designated time interval of the activation of alarm A, wherein alarms A and B are activated followed by de-activation of alarm B and de-activation of alarm A within said designated time interval, with said signal processing means assigning secondary importance to alarm A.

21. The system of claim 1 where alarm A is a blocking condition for alarm B and wherein alarm A is activated and alarm B is not activated, with said signal processing means assigning a level of importance to alarm A in accordance with its relationship categories to other activated alarms.

22. The system of claim 1 further comprising means for displaying alarm A.

23. The system of claim 1 where alarm A is a blocking condition for alarm B and wherein alarm B is activated and alarm A is not activated, with said signal processing means assigning a level of importance to alarm B in accordance with its relationship categories to other activated alarms.

24. The system of claim 1 where alarm A is a blocking condition for alarm B and wherein alarms A and B are both activated, with said signal processing means blocking alarm B and allowing the priority of alarm A to remain unchanged.

25. The system of claim 24 further comprising display means for displaying alarm A in an unchanged manner and for preventing the display of alarm B.

26. The system of claim 1 wherein said recording means includes at least one programmable sequential events recorder.

27. The system of claim 26 wherein said signal processing means includes at least one computer.

28. The system of claim 27 wherein said recording means includes first and second programmable sequential events recorders and said signal processing means includes first and second computers, wherein said first programmable sequential events recorder is coupled to said first computer and said second sequential events recorder is coupled to said second computer.

29. The system of claim 1 further comprising a plurality of display workstations coupled to said signal processing means for providing a visual alarm display.

* * * * *